United States Patent [19]
Larsen

[11] 3,830,066
[45] Aug. 20, 1974

[54] APPARATUS AND SYSTEM FOR PRODUCING AND PROTECTING DEPOSITS OF SEDIMENTARY MATERIAL ON FLOORS OF BODIES OF WATER

[76] Inventor: Ole Fjord Larsen, Auroravej 32A, Rodovre, Copenhagen, Denmark

[22] Filed: Apr. 13, 1971

[21] Appl. No.: 133,720

Related U.S. Application Data

[63] Continuation of Ser. No. 667,954, Sept. 15, 1967, abandoned.

[52] U.S. Cl. ............................................. 61/3
[51] Int. Cl. ......................................... E02b 3/04
[58] Field of Search ..................... 61/3, 4, 1, 2.5

[56] References Cited
UNITED STATES PATENTS

| | | | |
|---|---|---|---|
| 224,398 | 2/1880 | Currie | 61/3 |
| 1,643,691 | 9/1927 | Bignell | 61/3 |
| 1,816,095 | 7/1931 | Stanford | 61/3 |
| 1,969,123 | 8/1934 | Doble | 61/4 |
| 2,069,715 | 2/1937 | Arpin | 61/4 |
| 2,655,790 | 10/1953 | Daley | 61/3 |
| 2,920,454 | 1/1960 | Wolf | 61/4 |
| 3,299,640 | 1/1967 | Nielsen | 61/3 |
| 3,309,876 | 3/1967 | Potter | 61/3 |

FOREIGN PATENTS OR APPLICATIONS

| | | | |
|---|---|---|---|
| 193 | 0/1909 | Great Britain | 61/3 |
| 877,057 | 9/1961 | Great Britain | 61/4 |
| 7,399 | 7/1937 | Great Britain | 61/3 |

Primary Examiner—Peter M. Caun
Attorney, Agent, or Firm—Diller, Brown, Ramik & Wight

[57] ABSTRACT

This disclosure relates to apparatus for producing and protecting deposits of sedimentary material on a floor of a body of water, the apparatus including a flexible sheet located beneath the surface of the water in at least partially upwardly spaced relationship close to but above the floor, and means for maintaining the flexible sheet so positioned. In its more specific aspects the sheet may be disposed either planar to the floor or arched concavely facing the floor and is preferably formed of mesh-like material having an edge entirely above or in contact with the floor and being supported from beneath and anchored in position.

1 Claim, 14 Drawing Figures

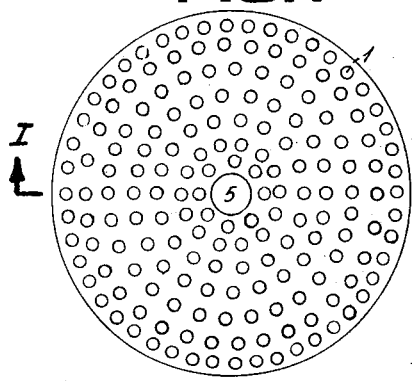
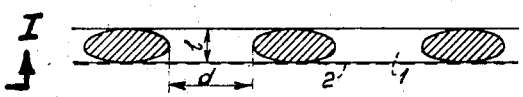
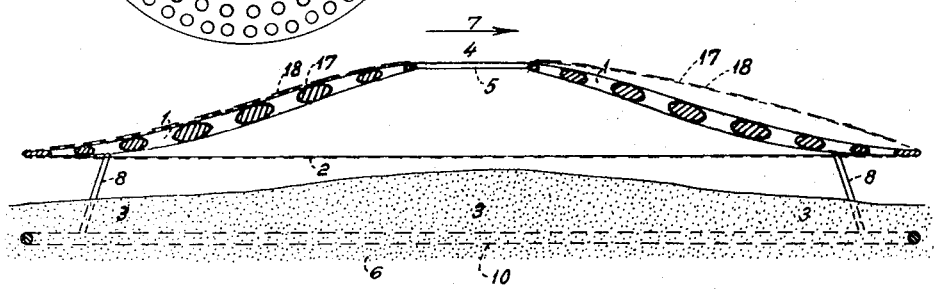
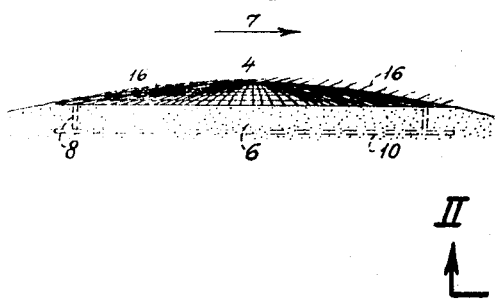
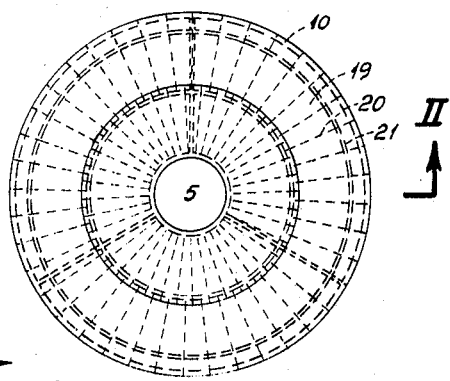
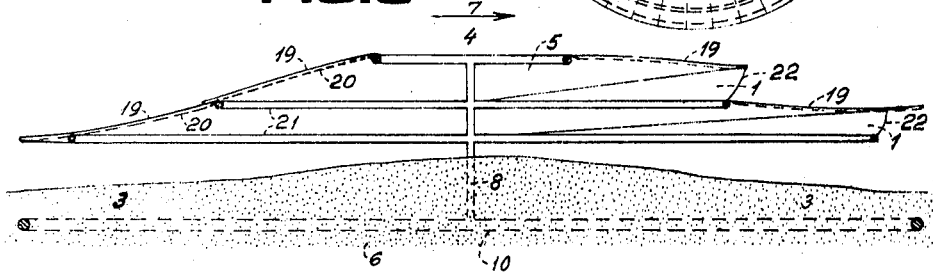

INVENTOR

O. Fjord Larsen

APPARATUS AND SYSTEM FOR PRODUCING AND PROTECTING DEPOSITS OF SEDIMENTARY MATERIAL ON FLOORS OF BODIES OF WATER

This is a continuation of parent application Ser. No. 667,954, now abandoned.

This invention relates to apparatus for and a method of protecting and depositing sand and other littorial drift material on the bottom of seas, lakes, rivers, and other bodies of water where the bottom and sides consist of erosionable material (sand, clay and the like).

Prior to the present invention various types of means have been suggested for producing and/or protecting deposits of sedimentary material on the floor of a body of water, such as lakes, rivers, or the like. However, until this invention no known apparatus for producing and/or protecting deposits of sedimentary material have been devised which not only preclude undermining of objects by waves or currents but also may be gradually elevated from the ocean, lake or similar floor so that sedimentary material can in effect be artificially built up to form shoals, reefs or other under surface land-like developments.

The invention from a method standpoint consists in that of providing a flexible preferably mesh material sheet which is located beneath the surface of the water in at least partially upwardly spaced relationship close to but above the floor, and means are provided for maintaining the flexible sheet so positioned. As waves, currents or the like pass by the flexible sheet material which drifts therebeneath is retained and a sedimentary build-up is progressively acheived. The flexible sheet may be initially disposed in plane or parallel relationship to the floor or the same may be arched concavely opening downwardly. Irrespective of the particular shape the flexible sheet is constructed such that the turbulence of the water is minimized beneath the sheet whereby undermining due to water motion is precluded and sedimentary deposition is assured. Moreover, by arranging a plurality of the flexible sheets in rows, particularly along sea or lake beds, and by raising the sheets successively solid off-shore bars can be created from naturally supplied sedimentary material which is moved by waves or current or for that matter by artificially supplied materials.

In addition to serving as a foundation for subsequent traditional work, such as building a breakwater parallel to the shroe line or perpendicular thereto, sedimentary deposits created as described can themselves be used to reform one coastal configuration to another or provide an off-shore coastal breakwater for a pre-existing shore line.

IN THE DRAWINGS:

FIG. 1 is a top plan view of a novel apparatus constructed in accordance with this invention for producing and protecting deposits of sedimentary material on a floor of a body of water, and illustrates apertures or channels in a support member for a flexible sheet.

FIG. 2 is an enlarged sectional view taken generally along the line I—I of FIG. 1, and illustrates details of the support, the flexible sheet, and the manner in which a portion of the support is anchored in the floor of the body of water.

FIG. 3 is an enlarged sectional view of a portion of the support of FIGS. 1 and 2, and illustrates details of the construction thereof.

FIG. 4 is a schematic view of the support with the flexible sheet consisting of mesh material and having attached thereto strips of flexible material whose specific gravity is less than that of water.

FIG. 5 is a top plan view of a modified form of this invention, and illustrates circular concentric widths of flexible material carried by a plurality of radial ribs which include ring members for supporting free ends of the ribs.

FIG. 6 is an enlarged sectional view taken generally along the line II—II of FIG. 5, and illustrates the manner in which current flow from left-to-right causes a variation in the opening and closing of the several concentric flexible sheets.

Figure 7:
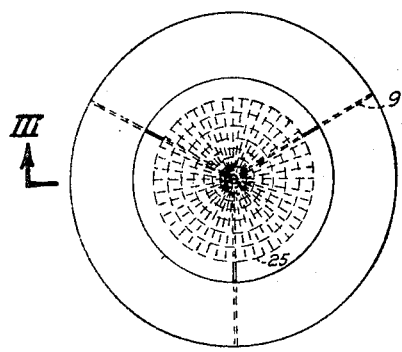
FIG. 7 is a top plan view of another apparatus constructed in accordance with this invention, and illustrates a central network which is adapted to rest upon the floor of a body of water which is in turn joined to an annular ring.
Figure 9:
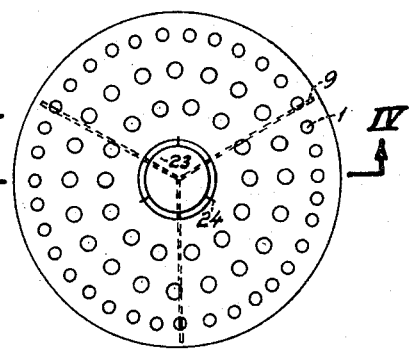
FIG. 9 is a view of another apparatus similar to FIG. 7, and illustrates a plurality of channels or apertures in a generally circular disc.

It is well known that if an object of casual shape rests upon the floor of a moving body of water the turbulence around the object will cause the object to become undermined and eventually sink into the floor and be covered by it. The present invention is concerned with particularly shaping objects or elements which avoid such undermining and actually stabilize the water bed floor and even cause a build-up of the floor by sedimentary deposition, rather than creating an undermining or washing away thereof. In accordance with the apparatus illustrated in FIG. 2 this invention contemplates the provision of a streamline element which is slightly arched at a central portion thereof and is located in spaced relationship above the floor or bottom 6 of a body of water, such as a lake, stream, river or the like. Due to the particular shape of the apparatus water flowing in the direction of the arrow 7 will have its current velocity decreased in the space 3 between the apparatus and the floor 6 causing the silting or sedimentation of material and a build-up of the floor bottom in the manner illustrated being partially begun in FIG. 2. The apparatus preferably may include apertures or channels 1 which because of the respective increased and decreased current velocity respectively above and below the apparatus and the resulting hydraulic pressure difference will cause an upward flow of water through the apertures at the lee side of the apparatus and consequently a horizontal flow toward the apparatus from surrounding areas. If, however, for some reason turbulence is to be minimized at the downstream side of the apparatus the height of the arch thereof is maintained at a minimum and, particularly in rivers, the apparatus may be plane or parallel relative to its disposition to the floor of the body of water involved. The apparatus is also disposed in a surface or plane at a desired distance above the initial floor 6 depending on such factors as the support thereof, the over-all water depth, the size and permeability of the apparatus and associated elements to be described more fully hereinafter, current conditions, etc. but in most cases the distance in practice will be on the order of 2–50 inches.

Preferably the apparatus is maintained in any desired position by support means in the form of legs 8 (FIGS. 2, 4 and 6) which must be as few and slender as possible in order to prevent excessive turbulence and prevent blockage in the area beneath the apparatus and the floor 6 as might occur if, for example, the current washed sea weed against too many closely spaced legs and precluded the flow characteristics desired and earlier described. Appropriately the legs 8 are mounted on a ring 10 functioning as an anchor or foundation for the apparatus to assure its immobility when in use. In lieu of the supporting legs 8 the apparatus may be kept at a desired distance above the bottom or floor 6 by utilizing buoyancy. In the latter case the specific gravity of the apparatus must be less than that of the water and this may be obtained, for example, by utilizing air-filled cavities in the apparatus and when a plurality of the apparatus are tied together they form a flexible carpet which is prevented from floating away by anchoring along its circumference with the anchors being made up of heavier elements supported on legs. As is shown in FIGS. 1, 2, 5, 6, 9 and 10 a larger opening 5 is formed at the center of the various apparatuses illustrated, and such construction is desirable to expedite the upper flow of the water by relieving excess hydraulic pressure which cannot flow rapidly through the smaller apertures 1. Moreover, any air which might be otherwise entrained beneath the apparatus may escape through the aperture 5. In order to prevent a downward flow of water through the opening 5 a horizontal thin plate or valve 23 (FIGS. 9 and 10) conventionally supported a slight distance over the opening 5 may be required with the support being achieved by as few supporting legs 24 as found possible.

The apertures or channels 1 may be equipped with strainers 2 of such a mesh width that they permit the water to flow therethrough but not the coarser material or sediment which eventually builds up beneath the apparatus. These strainers can be fixed to the high pressure side of the apparatus immediately outside the mouths of the apertures (FIG. 2) or they may be rigid material which would thereby close the area between it and the apparatus at each aperture.

Figure 12:
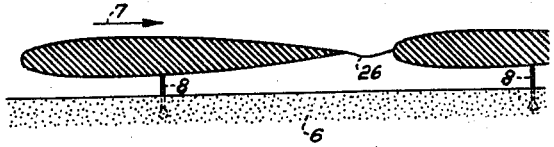
FIG. 12 is a cross-sectional view of another apparatus similar to FIG. 11 except that the convexities of upper and lower surfaces are asymmetrical with the thicker side being upstream relative to wave or current movement direction.

With the apparatuses arranged close to each other in rows (FIG. 12) the same may be interconnected by suitable elements 26 to assure desired distance between the various apparatuses as well as affording mutual support thereof against waves, current, flow or the like.

The apparatuses of this invention are all preferably raised as sediment increases in height thereunder as by utilizing buoyancy to achieve the vertical lifting force in conjunction with vibration to free the apparatus from the built-up sediment. The buoyancy can be provided by means of compressed air which is pumped into cavities of the apparatus during the elevating process and afterwards these cavities may be appropriately vented through valves to atmosphere. Each apparatus can be raised by means of a folded balloon which is suitably blown up during the elevating process.

Figure 11:
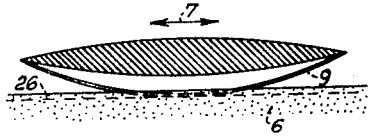
FIG. 11 is a cross-sectional view of another apparatus constructed in accordance with this invention and illustrates the construction thereof as a double-convex member supported upon rockers which in turn rest upon the floor of the body of water.

In further accordance with this invention the apparatus may be mounted on rockers 9 (FIGS. 8, 10 and 11) so that each apparatus may rock to and fro on the bed under the influence of waves and/or current and in this way continually lift itself to the top of the deposited material. In these cases the apparatus should be so low and flat that the upstream side always will turn down (FIGS. 8, 10 and 11) and the downstream side up under the actual direction of current flow as indicated by the arrow 7 in FIGS. 8 and 10. However, to assure that the rockers 9 will not sink too deeply into the bottom or the sedimentary material 6 they may be equipped with a network 25 (FIG. 7).

Referring once again to FIGS. 1–3 of the drawings in keeping with a preferred form of this invention the same may be constructed from concrete, steel or plastic. To insure the upward flow of the water the openings 1 are at right angles to the surface of the apparatus or shell, and the edges thereof are preferably rounded (FIG. 3). The number of apertures may be lower if the diameter $d$ of the apertures is large or higher if the diameter $d$ is smaller (FIG. 3). The total area of the channels may constitute at least 30–40 percent of the surface of the element (FIG. 1). The ratio $d/l$ of the openings 1 (FIG. 3) should be so small that the horizontal currents over the apparatus are forced therealong and over but yet permit current below the apparatus to escape through the apertures at the downstream side. The ratio therefore should vary with the location of the openings 1 on the apparatus dependent upon the steepness of the area of the apparatus in which the openings are to be situated. With increased steepness the ratio would decrease correspondingly, by varying $d$ and/or $l$. For example, on an apparatus of a sinusoidal cross-section with channels 1 of a constant diameter $d$, the thickness $l$ of the apparatus may vary progressively from top to bottom being thinner at the top and bottom and thicker at its center.

In order to increase the suction effect created by the differential in current velocity between upper and lower surfaces of the apparatus the same may be equipped with a rectifying membrane which regulates the flow through the channels by allowing upward flow from beneath the element or apparatus through the apertures 1 to an area 4 thereabove while impeding flow in the opposite (downward) direction. Such rectifier may consist of a large mesh net 17 (FIG. 2) which covers loosely the apparatus. The net 17 is made of a flexible material and is attached to the element only along the circumference and possibly at the top of the apparatus so it can be lifted locally from the surface of the apertured apparatus by current flow. Preferably the net 17 is provided with a circular piece of impermeable cloth 18 which covers only the apertures 1. Due to this construction at the upstream side of the apparatus the current will force the net downwardly tight against the over-all surface of the apparatus thereby preventing downward flow through the channels or apertures 1 at this side whereas at the downstream side the currents will lift the net and the cloths or valves 18 so that the flow from beneath can escape through the apertures 1.

Another type of rectifying membrane may consist of strips 16 (FIG. 4) of impermeable flexible or stiff material which are simply hinged by one end to the upper side of the apparatus. The hinge will allow for the turning or pivoting of the strip in one plane radially to the apparatus, which is the same case if flexible strips are placed radially lying on the apparatus attached by their lower ends about which they can bend backwards in a radial plane. If desired, the hinge may be of a construction to permit the strips to turn or pivot universally in all directions. These strips may be formed as threads or leaves attached to the apparatus by thin flexible threads and may consist of a material of a specific gravity less than that of the water such that the threads or leaves will normally rise or stand up in still water. However, with the current flow as indicated by the arrow 7 in FIG. 4 these strips on the upstream side of the apparatus will be forced down upon its surface covering the openings 1 to prevent downward flow therethrough whereas on the downstream side the flow through the apertures 1 from beneath will elevate the strips and preclude the apertures 1 from being closed. The use of such rectifiers allows the apparatus to be permeable, i.e., a greater number of the openings 1 provided per unit area. If desired the apparatus may be overcovered by a wire net, shown in FIG. 4 as a paraboloid and to the upper side thereof may be attached the threads or leaves 16 as described earlier.

In another preferred embodiment of the invention (FIGS. 5 and 6) in which resistance against the upward flow on the downstream side of the apparatus is at a minimum, the apparatus embodies one or more consecutive concentric circular widths of impermeable cloth 19. Each width is limited by two concentric circles and is supported by radial ribs 20 which rest on two circular rings 21 along the boundaries of the cloths 19. The ribs are hinged loosely by their uppermost ends to the inner ring and rest loosely or freely on top of the outer ring. On the upstream side of the apparatus the cloth 19 and ribs 20 will be pressed down by the current and will therefore overly the apparatus whereas on the downstream side the flow from beneath will lift and fold the cloth to form channels or openings 1 in which resistance to flow will be minimal (FIG. 6). In order to prevent the radial ribs 20 from turning over the amplitude of their swing or pivot may be limited by strings 22 connected between the outer rings and the concentric cloths 19. The cloths 19 may be, for example, preferably plastic material with the ribs being integral reinforced thickening of such material.

Figure 8:
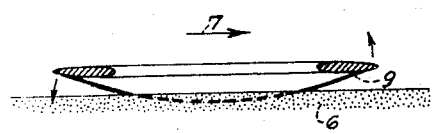
FIG. 8 is a sectional view taken along line III—III of FIG. 7, and more clearly illustrates the operation of the apparatus of FIG. 7 when current flow is from left-to-right in FIG. 8.
Figure 10:
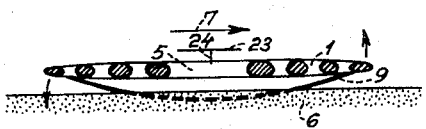
FIG. 10 is a sectional view taken generally along line IV—IV of FIG. 9, and illustrates further details of the operation of the apparatus of FIG. 9 when current flow is from left-to-right in FIG. 10.

The apparatuses of FIGS. 7–10 are extremely open and permeable with respect to the upper and lower sides thereof and there is minimum resistance to vertical flow which results in the rocking action indicated by the unnumbered headed arrows associated therewith. In FIGS. 7 and 8 the apparatus is simply a ring which is preferably symmetrical and therefore the upstream and downstream halves act somewhat independently to achieve the rocking action and therefrom a minimum of turbulence. These structures are somewhat different from those of FIGS. 11 and 12 which are solid bodies of what is best termed a double-convex cross section which may be symmetrical (FIG. 11) or asymmetrical (FIG. 12) which in the latter case the thicker side facing the direction of current flow.

Figure 13:
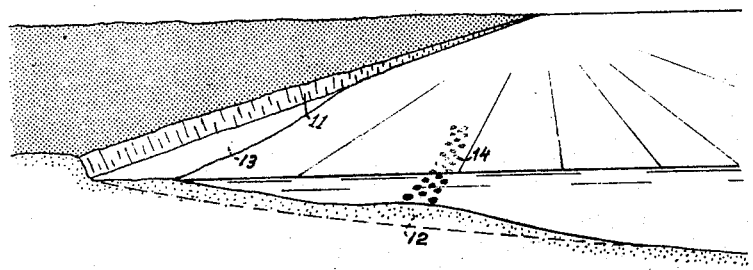
FIG. 13 is a perspective view, partly in section, taken along line V—V of FIG. 14, and illustrates the use of a plurality of the apparatuses of the present invention for protecting or forming deposits of sediment to form sand bars or similar off-shore underwater contours.
Figure 14:
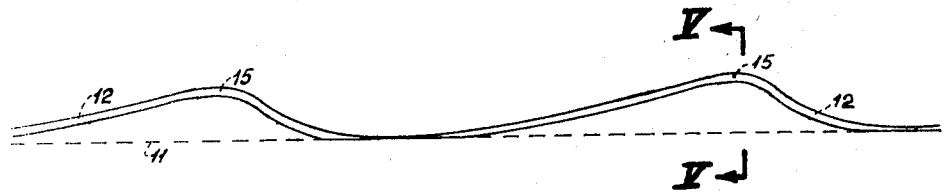
FIG. 14 is a schematic plan view looking from left-to-right in FIG. 13 along line VI—VI, and illustrates the formation of sand bars or the like by the dispositions of the apparatuses along the coast or shore line.

The described invention makes it possible to protect open sandy coast on a large scale by reforming the coast line into sand bars, as is best indicated at 12 in FIGS. 13 and 14. Where the sandy coast in nature comprise more resistable, i.e., rocky, sections the coast line will assume the form of a garland-like row of concave arcs with these resistable sections as points 15. In this way nature develops a coast of equilibrium stabilized as to the drift of material. The apparatuses are spaced at intervals on the order of 1/2 10 mils and at 3–10 times the distance from the coastline offshore coast parallel bars can be created and protected by means of this apparatus. Between these resistible points 15 an advanced equilibrium coast 12 will consequently develop naturally, either as continuous sand bars 12 or solid head lands 13 (FIGS. 13 and 14).

I claim:

1. Apparatus for producing and protecting deposits of sedimentary material on a floor of a body of water, said apparatus comprising a flexible sheet located beneath the surface of the water in at least partially upwardly spaced relationship close to but above said floor, means for maintaining said flexible sheet so positioned, and at least one additional flexible sheet which with said first-mentioned flexible sheet are disposed in circular concentric relationship.

* * * * *